US009860390B2

(12) United States Patent
Terrien et al.

(10) Patent No.: US 9,860,390 B2
(45) Date of Patent: Jan. 2, 2018

(54) METHODS, SYSTEMS, AND COMPUTER READABLE MEDIA FOR POLICY EVENT RECORD GENERATION

(75) Inventors: Olivier Terrien, Chapel Hill, NC (US); Bradford Cervenak, Westborough, MA (US)

(73) Assignee: Tekelec, Inc., Morrisville, NC (US)

( * ) Notice: Subject to any disclaimer, the term of this patent is extended or adjusted under 35 U.S.C. 154(b) by 107 days.

(21) Appl. No.: 13/572,132

(22) Filed: Aug. 10, 2012

(65) Prior Publication Data
US 2013/0041994 A1 Feb. 14, 2013

Related U.S. Application Data

(60) Provisional application No. 61/522,224, filed on Aug. 10, 2011.

(51) Int. Cl.
*G06F 15/173* (2006.01)
*H04M 15/00* (2006.01)
(Continued)

(52) U.S. Cl.
CPC ........ *H04M 15/8027* (2013.01); *H04L 43/16* (2013.01); *H04L 47/19* (2013.01);
(Continued)

(58) Field of Classification Search
CPC ...... H04M 15/66; H04M 15/00; H04M 15/58; H04M 15/64; H04M 15/83; H04M 15/85; H04M 15/852; H04M 15/88; H04M 15/885; H04M 15/886; H04M 15/888; H04L 12/1407; H04L 12/14; H04L 12/1403;
(Continued)

(56) References Cited

U.S. PATENT DOCUMENTS 5,901,352 A 5/1999 St-Pierre et al.
6,144,636 A 11/2000 Aimoto et al.
(Continued)

FOREIGN PATENT DOCUMENTS

CN ZL201080064945.X 11/2015
EP 0 857 399 B1 5/2004
(Continued)

OTHER PUBLICATIONS

Non-Final Office Action for U.S. Appl. No. 13/572,156 (dated May 23, 2014).
(Continued)

*Primary Examiner* — Kevin Bates
*Assistant Examiner* — Ronak Patel
(74) *Attorney, Agent, or Firm* — Jenkins, Wilson, Taylor & Hunt, P.A.

(57) ABSTRACT

According to one aspect, the subject matter described herein includes a method for generating a policy event record (PER). The method includes receiving one or more policy event attributes (PEAs) and using the received PEAs to select one or more policy definitions that are associated with a communication session. The method also includes analyzing the selected one or more policy definitions and initiating one or more associated policy actions. The method further includes generating a policy event record that includes information that identifies the one or more selected policy definitions.

16 Claims, 9 Drawing Sheets

(51) Int. Cl.
*H04L 12/26* (2006.01)
*H04L 12/801* (2013.01)
H04L 12/24 (2006.01)
H04L 12/14 (2006.01)
H04L 29/06 (2006.01)

(52) U.S. Cl.
CPC ...... *H04L 12/1403* (2013.01); *H04L 41/5074* (2013.01); *H04L 63/0892* (2013.01)

(58) Field of Classification Search
CPC .............. H04L 12/1417; H04L 12/145; H04L 12/1492; H04L 41/0893; H04L 41/5022; H04L 41/5029; H04L 47/72; H04L 47/781; H04L 47/824; H04L 63/102; H04L 63/20; H04W 28/16; H04W 4/24; H04W 80/04; H04W 76/022; H04W 28/24; H04W 36/0044; H04W 36/14; H04W 76/02; H04W 76/021
USPC ........................................................ 709/223
See application file for complete search history.

(56) References Cited

U.S. PATENT DOCUMENTS

| | | | |
|---|---|---|---|
| 6,661,780 B2 | 12/2003 | Li | |
| 7,072,651 B2 | 7/2006 | Jiang et al. | |
| 8,305,922 B2 | 11/2012 | Cuervo | |
| 8,326,263 B2* | 12/2012 | Zhou et al. | 455/408 |
| 8,331,229 B1 | 12/2012 | Hu et al. | |
| 8,335,220 B2* | 12/2012 | Hu et al. | 370/400 |
| 8,353,000 B2* | 1/2013 | He et al. | 726/1 |
| 8,400,916 B2* | 3/2013 | Cutler et al. | 370/230 |
| 8,406,137 B2* | 3/2013 | Siddam et al. | 370/235 |
| 8,438,290 B2* | 5/2013 | Rui et al. | 709/227 |
| 8,458,767 B2* | 6/2013 | Riley | H04L 41/5058 726/1 |
| 8,543,118 B1 | 9/2013 | Mangal et al. | |
| 8,577,329 B2* | 11/2013 | Momtahan et al. | 455/405 |
| 8,601,073 B2 | 12/2013 | Craig et al. | |
| 8,605,583 B2* | 12/2013 | Cutler et al. | 370/230 |
| 8,626,156 B2* | 1/2014 | Marsico | 455/432.1 |
| 8,630,925 B2* | 1/2014 | Bystrom et al. | 705/30 |
| 8,675,487 B2* | 3/2014 | Siddam et al. | 370/235 |
| 8,681,622 B2 | 3/2014 | Chatterjee et al. | |
| 8,683,544 B2 | 3/2014 | Foottit et al. | |
| 8,787,174 B2 | 7/2014 | Riley et al. | |
| 8,812,020 B2 | 8/2014 | Marsico | |
| 8,818,327 B2 | 8/2014 | Shaikh | |
| 8,824,315 B2 | 9/2014 | Kokkinen et al. | |
| 9,106,769 B2 | 8/2015 | Kanode et al. | |
| 9,154,998 B2 | 10/2015 | Zhu et al. | |
| 9,166,803 B2* | 10/2015 | Riley | H04L 12/14 |
| 9,185,510 B2 | 11/2015 | Nas | |
| 9,369,910 B2 | 6/2016 | Rajagopalan et al. | |
| 9,473,928 B2 | 10/2016 | Rajagopalan et al. | |
| 2003/0003928 A1 | 1/2003 | Marjelund et al. | |
| 2004/0116117 A1 | 6/2004 | Ahvonen et al. | |
| 2005/0013423 A1 | 1/2005 | Eversen et al. | |
| 2005/0064889 A1 | 3/2005 | Haumont | |
| 2005/0107091 A1 | 5/2005 | Vannithamby et al. | |
| 2005/0176438 A1 | 8/2005 | Li | |
| 2005/0195743 A1 | 9/2005 | Rochberger et al. | |
| 2007/0054665 A1 | 3/2007 | Elkarat et al. | |
| 2007/0153995 A1 | 7/2007 | Fang et al. | |
| 2007/0165599 A1 | 7/2007 | Skog et al. | |
| 2007/0195788 A1 | 8/2007 | Vasamsetti et al. | |
| 2007/0232301 A1 | 10/2007 | Kueh | |
| 2007/0259673 A1 | 11/2007 | Willars et al. | |
| 2008/0021993 A1 | 1/2008 | Compton et al. | |
| 2008/0043689 A1 | 2/2008 | Walter | |
| 2008/0046963 A1* | 2/2008 | Grayson | H04L 12/66 726/1 |
| 2008/0142599 A1 | 6/2008 | Benillouche et al. | |
| 2008/0153484 A1 | 6/2008 | Boni et al. | |
| 2008/0159194 A1 | 7/2008 | Westman et al. | |
| 2008/0205345 A1 | 8/2008 | Sachs et al. | |
| 2009/0061855 A1 | 3/2009 | Sethi et al. | |
| 2009/0109845 A1 | 4/2009 | Andreasen et al. | |
| 2009/0111458 A1 | 4/2009 | Fox et al. | |
| 2009/0141625 A1* | 6/2009 | Ghai | H04L 12/5695 370/230 |
| 2009/0185494 A1 | 7/2009 | Li et al. | |
| 2009/0207730 A1 | 8/2009 | Stamoulis et al. | |
| 2009/0219946 A1 | 9/2009 | Liu et al. | |
| 2009/0225762 A1 | 9/2009 | Davidson et al. | |
| 2009/0228956 A1 | 9/2009 | He et al. | |
| 2009/0232019 A1 | 9/2009 | Gupta et al. | |
| 2009/0270099 A1 | 10/2009 | Gallagher et al. | |
| 2009/0325574 A1 | 12/2009 | Izawa et al. | |
| 2010/0048161 A1 | 2/2010 | He et al. | |
| 2010/0080171 A1 | 4/2010 | Rune et al. | |
| 2010/0091671 A1 | 4/2010 | Lidstrom et al. | |
| 2010/0121960 A1 | 5/2010 | Baniel et al. | |
| 2010/0142373 A1* | 6/2010 | Jin | H04L 12/14 370/230 |
| 2010/0189004 A1 | 7/2010 | Mirandette et al. | |
| 2010/0190497 A1 | 7/2010 | Pudney et al. | |
| 2010/0192170 A1 | 7/2010 | Raleigh | |
| 2010/0241496 A1 | 9/2010 | Gupta et al. | |
| 2010/0246500 A1 | 9/2010 | Rydnell et al. | |
| 2010/0284278 A1 | 11/2010 | Alanara | |
| 2010/0287121 A1 | 11/2010 | Li et al. | |
| 2010/0291924 A1 | 11/2010 | Antrim et al. | |
| 2010/0297985 A1 | 11/2010 | Van Erlach | |
| 2010/0299451 A1 | 11/2010 | Yigang et al. | |
| 2011/0035495 A1 | 2/2011 | Ekström et al. | |
| 2011/0067085 A1 | 3/2011 | Brouard et al. | |
| 2011/0076985 A1 | 3/2011 | Chami et al. | |
| 2011/0103261 A1 | 5/2011 | Duan | |
| 2011/0116382 A1 | 5/2011 | McCann et al. | |
| 2011/0122886 A1 | 5/2011 | Willars et al. | |
| 2011/0138066 A1 | 6/2011 | Kopplin et al. | |
| 2011/0158090 A1* | 6/2011 | Riley | H04L 12/14 370/230 |
| 2011/0165901 A1 | 7/2011 | Baniel et al. | |
| 2011/0171958 A1 | 7/2011 | Hua et al. | |
| 2011/0188457 A1 | 8/2011 | Shu et al. | |
| 2011/0199903 A1 | 8/2011 | Cuervo | |
| 2011/0217979 A1 | 9/2011 | Nas | |
| 2011/0225281 A1* | 9/2011 | Riley | H04L 12/14 709/223 |
| 2011/0225306 A1 | 9/2011 | Delsesto et al. | |
| 2011/0264803 A1 | 10/2011 | Yuen et al. | |
| 2011/0299395 A1 | 12/2011 | Mariblanca Nieves | |
| 2011/0307790 A1 | 12/2011 | Pandya et al. | |
| 2011/0314145 A1 | 12/2011 | Raleigh et al. | |
| 2011/0317557 A1 | 12/2011 | Siddam et al. | |
| 2012/0008544 A1 | 1/2012 | Nakagawa et al. | |
| 2012/0014332 A1 | 1/2012 | Smith et al. | |
| 2012/0028626 A1 | 2/2012 | Marocchi et al. | |
| 2012/0039175 A1 | 2/2012 | Sridhar et al. | |
| 2012/0044867 A1 | 2/2012 | Faccin et al. | |
| 2012/0052866 A1 | 3/2012 | Froehlich et al. | |
| 2012/0057463 A1 | 3/2012 | Hurtta et al. | |
| 2012/0087368 A1 | 4/2012 | Kunarathnam et al. | |
| 2012/0096177 A1* | 4/2012 | Rasanen | H04L 69/40 709/228 |
| 2012/0099438 A1 | 4/2012 | Wang et al. | |
| 2012/0099529 A1 | 4/2012 | Williams | |
| 2012/0099715 A1* | 4/2012 | Ravishankar | H04L 12/1407 379/114.01 |
| 2012/0115478 A1 | 5/2012 | Gunaratnam et al. | |
| 2012/0131165 A1 | 5/2012 | Baniel et al. | |
| 2012/0140632 A1 | 6/2012 | Norp et al. | |
| 2012/0142311 A1 | 6/2012 | Rui et al. | |
| 2012/0155389 A1 | 6/2012 | McNamee et al. | |
| 2012/0176894 A1 | 7/2012 | Cai et al. | |
| 2012/0203781 A1 | 8/2012 | Wakefield | |
| 2012/0213072 A1 | 8/2012 | Kotecha et al. | |
| 2012/0215930 A1 | 8/2012 | Stenfelt et al. | |
| 2012/0221445 A1 | 8/2012 | Sharma | |
| 2012/0221693 A1 | 8/2012 | Cutler et al. | |

(56) References Cited

U.S. PATENT DOCUMENTS

| | | |
|---|---|---|
| 2012/0250573 A1 | 10/2012 | Kulasingam et al. |
| 2012/0250613 A1 | 10/2012 | Robinson et al. |
| 2012/0281617 A1 | 11/2012 | Bumiller |
| 2012/0290452 A1 | 11/2012 | Pancorbo Marcos et al. |
| 2012/0303796 A1 | 11/2012 | Mo et al. |
| 2013/0039176 A1 | 2/2013 | Kanode et al. |
| 2013/0070594 A1 | 3/2013 | Garcia Martin et al. |
| 2013/0079006 A1 | 3/2013 | Cho et al. |
| 2013/0114404 A1 | 5/2013 | Yang |
| 2013/0160058 A1 | 6/2013 | Albal et al. |
| 2013/0163429 A1 | 6/2013 | Dunstan et al. |
| 2013/0177146 A1 | 7/2013 | Schneider et al. |
| 2013/0265911 A1 | 10/2013 | Kulaingam et al. |
| 2013/0279401 A1 | 10/2013 | Sander et al. |
| 2014/0011512 A1 | 1/2014 | Hu et al. |
| 2014/0018067 A1 | 1/2014 | Rajagopalan et al. |
| 2014/0022897 A1 | 1/2014 | Rajagopalan et al. |
| 2014/0031029 A1 | 1/2014 | Rajagopalan et al. |
| 2014/0040975 A1 | 2/2014 | Raleigh et al. |
| 2015/0011182 A1 | 1/2015 | Goldner et al. |

FOREIGN PATENT DOCUMENTS

| | | |
|---|---|---|
| EP | 1 988 680 A1 | 11/2008 |
| EP | 2 093 931 A1 | 8/2009 |
| EP | 2 403 186 A1 | 1/2012 |
| EP | 2 555 562 A1 | 2/2013 |
| EP | 2 520 045 B1 | 7/2015 |
| JP | 2012070107 A | 4/2012 |
| JP | 2013540380 A | 12/2013 |
| WO | WO 2009/049684 A1 | 4/2009 |
| WO | WO 2009/058067 A1 | 5/2009 |
| WO | WO 2009/070179 A1 | 6/2009 |
| WO | WO 2009/082806 A1 | 7/2009 |
| WO | WO 2009/149341 A2 | 12/2009 |
| WO | WO 2011/082035 A2 | 7/2011 |
| WO | WO 2011/120229 A1 | 10/2011 |
| WO | WO 2012/077073 A1 | 6/2012 |
| WO | WO 2012/083795 A1 | 6/2012 |
| WO | WO 2013/030659 A1 | 3/2013 |
| WO | WO 2014/014823 A1 | 1/2014 |
| WO | WO 2014/014829 A1 | 1/2014 |
| WO | WO 2014/015331 A1 | 1/2014 |

OTHER PUBLICATIONS

Final Office Action for U.S. Appl. No. 13/040,020 (dated Sep. 19, 2014).
First Office Action for Chinese Application No. 201080064945.X (dated Sep. 17, 2014).
Communication of extended European Search Report for European Patent Application No. 10841576.1 (dated May 9, 2014).
Non-Final Office Action for U.S. Appl. No. 13/040,020 (dated Apr. 21, 2014).
Applicant-Initiated Interview Summary for U.S. Appl. No. 13/040,020 (dated Mar. 20, 2014).
Notice of Allowance and Fee(s) Due for U.S. Appl. No. 12/973,228 (dated Mar. 20, 2014).
Notice of Allowance and Fee(s) Due for U.S. Appl. No. 13/251,784 (dated Feb. 12, 2014).
Final Office Action for U.S. Appl. No. 13/040,020 (dated Dec. 13, 2013).
Notification of Transmittal of the International Search Report and the Written Opinion of the International Searching Authority, or the Declaration for International Application No. PCT/US2013/050512 (dated Dec. 2, 2013).
Notice of Allowance and Fee(s) Due for U.S. Appl. No. 13/330,086 (dated Nov. 6, 2013).
Notification of Transmittal of the International Search Report and the Written Opinion of the International Searching Authority, or the Declaration for International Application No. PCT/US2013/051447 (dated Oct. 28, 2013).
Non-Final Office Action for U.S. Appl. No. 12/973,228 (dated Oct. 25, 2013).
Non-Final Office Action for U.S. Appl. No. 13/251,784 (dated Oct. 10, 2013).
Advisory Action for U.S. Appl. No. 13/251,784 (dated Sep. 6, 2013).
Notice of Allowance and Fee(s) Due for U.S. Appl. No. 13/276,916 (dated Sep. 3, 2013).
Non-Final Office Action for U.S. Appl. No. 13/040,020 (dated Jul. 18, 2013).
Final Office Action for U.S. Appl. No. 13/251,784 (dated Jun. 26, 2013).
Final Office Action for U.S. Appl. No. 12/973,228 (dated Jun. 21, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).
Non-Final Office Action for U.S. Appl. No. 13/276,916 (dated Apr. 11, 2013).
Non-Final Office Action for U.S. Appl. No. 12/973,228 (dated Feb. 1, 2013).
Non-Final Office Action for U.S. Appl. No. 13/251,784 (dated Dec. 19, 2012).
Communication of European Publication Number and Information on the Application of Article 67(3) EPC for European Patent Application No. 10841576.1 (dated Oct. 10, 2012).
"Digital cellular telecommunications system (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).
Notification of Transmittal of the International Search Report and the Written Opinion of the International Searching Authority, or the Declaration for International Patent Application No. PCT/US2010/061586 (dated Sep. 26, 2011).
3GPP, "3rd Generation Partnership Project; Technical Specification Group Services and System Aspects; Universal Geographical Area Description (GAD) (Release 10)," 3GPP TS 23.032 V10.0.0, pp. 1-29 (Mar. 2011).
"Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).
Znaty, "Diameter, GPRS, (LTE+ePC=EPS), IMS, PCC and SDM," Effort, pp. 1-229 (Part 1 of 2) (May 2010).

(56) References Cited

OTHER PUBLICATIONS

Znaty, "Diameter, GPRS, (LTE+ePC=EPS), IMS, PCC and SDM," Efort pp. 230-461 (Part 2 of 2) (May 2010).
"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).
3GPP, "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
International Standard, "Maritime Navigation and Radiocommunication Equipment and Systems—Digital Interfaces—Part 1: Single Talker and Multiple Listeners," IEC 61162-1, Second edition, pp. 1-86 (Jul. 2000).
Commonly-assigned, co-pending U.S. Appl. No. 13/572,156 for "Methods, Systems, and Computer Readable Media for Congestion Management in a Diameter Signaling Network," (Unpublished, filed Aug. 10, 2012).
Calhoun et al., "Diameter Base Protocol," RFC 3588, pp. 1-147 (Sep. 2003).
Non-Final Office Action for U.S. Appl. No. 13/942,323 (dated Feb. 25, 2015).
Non-Final Office Action for U.S. Appl. No. 13/040,020 (dated Jan. 29, 2015).
Non-Final Office Action for U.S. Appl. No. 13/947,314 (dated Jan. 16, 2015).
Final Office Action for U.S. Appl. No. 13/572,156 (dated Dec. 29, 2014).
Advisory Action and Examiner-Initiated Interview Summary for U.S. Appl. No. 13/040,020 (dated Dec. 5, 2014).
Applicant-Initiated Interview Summary for U.S. Appl. No. 13/465,601 (dated Dec. 5, 2014).
Final Office Action for U.S. Appl. No. 13/942,205 (dated May 19, 2015).
Communication of European Publication Number and Information on the Application of Article 67(3) EPC for European Application No. 13819665.4 (dated Apr. 22, 2015).
Applicant-Initiated Interview Summary for U.S. Appl. No. 13/942,205 (dated Jan. 30, 2015).
Non-Final Office Action for U.S. Appl. No. 13/942,205 (dated Nov. 6, 2014).
Notification of Transmittal of the International Search Report and the Written Opinion of the International Searching Authority, or the Declaration for International Application No. PCT/US2013/050497 (dated Oct. 29, 2013).
Ye et al., "Enabling Local Breakout from eNB in LTE Networks," 2012 IEEE International Conference on Communications (ICC), pp. 6982-6986 (Jun. 10-15, 2012).
"3rd Generation Partnership Project; Technical Specification Group Services and System Aspects; Local IP Access and Selected IP Traffic Offload (LIPA-SIPTO) (Release 10)," 3GPP TR 23.829, pp. 1-43 (Oct. 2011).
Balbás et al., "Policy and Charging Control in the Evolved Packet System," LTE—3GPP Release 8, IEEE Communications Magazine, pp. 68-74 (Feb. 2009).
Final Office Action for U.S. Appl. No. 13/942,323 (dated Jun. 9, 2015).
Communication under Rule 71(3) EPC for European Patent Application No. 10 841 576.1 (dated May 7, 2015).
Notification of the Second Office Action for Chinese Patent Application No. 201080064945.X (dated Apr. 22, 2015).
Communication of European Publication Number and Information on the Application of Article 67(3) EPC for European Patent Application No. 13819435.2 (dated Apr. 30, 2015).
Applicant-Initiated Interview Summary for U.S. Appl. No. 13/040,020 (dated Apr. 28, 2015).
Communication of European Publication Number and Information on the Application of Article 67(3) EPC for European Patent Application No. 13820508.3 (dated Apr. 22, 2015).
Notice of Allowance and Fee(s) Due and Interview Summary for U.S. Appl. No. 13/572,156 (dated Apr. 6, 2015).
Non-Final Office Action for U.S. Appl. No. 13/048,640 (dated Jan. 20, 2016).
Advisory Action and AFCP 2.0 Decision for U.S. Appl. No. 13/048,640 (dated Jul. 15, 2015).
Final Office Action for U.S. Appl. No. 13/048,640 (dated Apr. 10, 2015).
Non-Final Office Action for U.S. Appl. No. 13/048,640 (dated Oct. 6, 2014).
Advisory Action for U.S. Appl. No. 13/048,640 (dated Dec. 20, 2013).
Final Office Action for U.S. Appl. No. 13/048,640 (dated Oct. 8, 2013).
Non-Final Office Action for U.S. Appl. No. 13/048,640 (dated Mar. 15, 2013).
3GPP, "Policy and Charging Control Architecture," TS 23.203 version 8.4.0 Release 8 (Jan. 2009).
3rd Generation Partnership Project, "Technical Specification Group Services and System Aspects; Policy Charging Control Architecture," 3GPP TS 23.203, v. 8.1.1 (Mar. 2008).
Extended European Search Report for European Application No. 13819665.4 (dated Feb. 12, 2016).
Extended European Search Report for European Application No. 13819435.2 (dated Feb. 9, 2016).
Notice of Allowance and Fee(s) Due for U.S. Appl. No. 13/942,323 (dated Feb. 5, 2016).
Extended European Search Report for European Application No. 13820508.3 (dated Feb. 3, 2016).
Applicant-Initiated Interview Summary for U.S. Appl. No. 13/942,205 (dated Jan. 22, 2016).
Advisory Action, Applicant-Initiated Interview Summary, & AFCP 2.0 Decision for U.S. Appl. No. 13/947,314 (dated Dec. 3, 2015).
Advisory Action & AFCP 2.0 Decision for U.S. Appl. No. 13/942,323 (dated Oct. 5, 2015).
Non-Final Office Action for U.S. Appl. No. 13/942,205 (dated Sep. 14, 2015).
Letter Regarding Decision to Grant for Chinese Patent Application No. 201080064945.X (dated Sep. 1, 2015).
Advisory Action Before the Filing of an Appeal Brief and AFCP 2.0 Decision for U.S. Appl. No. 13/942,205 (dated Jul. 31, 2015).
Final Office Action & Applicant-Initiated Interview Summary for U.S. Appl. No. 13/947,314 (dated Jul. 16, 2015).
Notice of Allowance and Fee(s) Due & Examiner-Initiated Interview Summary for U.S. Appl. No. 13/040,020 (dated Jul. 8, 2015).
"Policy on the Mobile: New Use Cases that Optimize Devices for the Network and Generate Revenue," An Oracle White Paper, pp. 1-15 (Dec. 2013).
Final Office Action for U.S. Appl. No. 13/048,640 (dated Sep. 13, 2016).
Non-Final Office Action for U.S. Appl. No. 13/947,314 (dated Jun. 24, 2016).
Notice of Allowance and Fee(s) Due for U.S. Appl. No. 13/942,205 (dated May 16, 2016).
Letter Regarding Office Action for Japanese Patent Application No. 2015-521879 (dated Jun. 20, 2017).
Non-Final Office Action for U.S. Appl. No. 13/947,314 (dated May 16, 2017).
Notification of the First Office Action for Chinese Patent Application No. 201410643664.X (dated May 4, 2017).
Letter Regarding Office Action for Japanese Patent Application No. 2015-521880 (dated Mar. 21, 2017).

(56) References Cited

OTHER PUBLICATIONS

Office Action for Indian Patent Application No. 9339/DELNP/2010 (dated Feb. 28, 2017).
Communication pursuant to Article 94(3) EPC for European Patent Application No. 13 820 508.3 (dated Feb. 9, 2017).
Tekelec et al., "Discussion paper on Usage-reporting from PCRF to OCS over Sy," 3GPP TSG SA WG2 #86, pp. 1-2 (Jul. 11-15, 2011).
Letter Regarding Office Action for Japanese Patent Application No. 2015-523302 (dated Mar. 14, 2017).
Advisory Action for U.S. Appl. No. 13/947,314 (dated Feb. 10, 2017).
Advisory Action and After Final Consideration Program Decision fore U.S. Appl. No. 13/048,640 (dated Jan. 30, 2017).
Final Office Action for U.S. Appl. No. 13/947,314 (dated Nov. 25, 2016).

\* cited by examiner

```
MFP HEADER
[ MFP LENGTH 184 ]                      ;; MFP LENGTH (START COUNTING AT THE BYTE AFTER THIS ONE)
[ TIMESTAMP FRI JULY 01 01:15:29.062 2011 ]  ;; SECONDS/MS
[ PAYLOAD SIZE 166 ]                    ;; SIZE OF PER
[ CHANNEL "PLCYEVNT" ]                  ;; CHANNEL, CONFIGURED IN EACH PCRF
[ TYPE 110 ]                            ;; TYPE 110 (NOT YET OFFICIALLY ASSIGNED)
[ WAY WAY_NOT_AVAILABLE ]               ;; WAY = WAY_NOT_AVAILABLE (254)
PER TLVs
[ VERSION = 1 ]
[ TIMESTAMP = 1309497329062 ]
[ USER ID = "IMEI:013552015719847" ]
[ RAT TYPE = WLAN ]
[ IP-CAN TYPE = DOCSIS ]
[ MCC-MNC = "310-012" ]
[ EVENT TYPE = MODIFY ]
[ SESSION ID = "PICLAB.TEKELEC.COM;09497329;1" ]
[ APP ID = 16777238 ]
[ PEER IDENTITY = "NSN6.TEKELEC.COM" ]
[ POLICY ID = 281474976841206 ]
[ POLICY ID = 281474976841208 ]
[ POLICY ID = 281474976841209 ]
[ POLICY ID = 281474976841212 ]
```

FIG. 6

| | | | QUOTA USAGE - APRIL 2011 | | | | |
|---|---|---|---|---|---|---|---|
| TIER | MONTHLY QUOTA (MB) | AVG. USAGE (MB) | # OF SUBSCRIBERS | QUOTA USAGE OF SUBSCRIBERS BY PERCENTAGE | | | |
| | | | | <=10% | >10% & <=80% | >80% & <=100% | >100% | xMB UPGRADED |
| PLATINUM | 5000 | 3000 | 100000 | 22% | 58% | 14% | 5% | 1% |
| GOLD | 2000 | 1500 | 200000 | 17% | 55% | 16% | 10% | 2% |
| SILVER | 1000 | 800 | 300000 | 10% | 45% | 27% | 15% | 3% |
| BRONZE | 500 | 320 | 400000 | 8% | 36% | 33% | 17% | 6% |

METHODS, SYSTEMS, AND COMPUTER READABLE MEDIA FOR POLICY EVENT RECORD GENERATION

PRIORITY CLAIM

This application claims the benefit of U.S. Provisional Patent Application Ser. No. 61/522,224, filed Aug. 10, 2011, the disclosure of which is incorporated herein by reference in its entirety.

TECHNICAL FIELD

The subject matter described herein relates to policy generation. More specifically, the subject matter relates to methods, systems, and computer readable media for policy event record generation.

BACKGROUND

Traditionally, control of quality of service (QoS) within telecommunications networks has been achieved using a combination of best-effort data delivery, network resources reservation, or data packet marking on data communication paths. However, the design of emerging next generation network (NGN) architectures (e.g., Internet protocol (IP) multimedia subsystem (IMS) and long term evolution (LTE)) will render this approach no longer viable. One feature of network topology within the various NGNs is that the signaling required to negotiate a data transfer (e.g., application signaling) may not travel on the same logical path as the actual data transfer itself (e.g., data traffic). Therefore, a policy entity is needed to link the application signaling on the service plane to data traffic on the transport plane in order to allow applications to request QoS to be performed on the traffic plane.

One example of such a policy entity is a policy and charging rules function (PCRF). The PCRF, or policy engine, generally is a policy decision point that may be centrally located in the network and may communicate with access edge devices (e.g., policy enforcement points), applications, and operational support systems/business support systems (OSS/BSS) platforms to manage subscriber and network information according to policy rules. These policy rules may be used to define how broadband network resources should be allocated to subscribers and applications and under what conditions. Policy rules may encompass the business and technological rules that govern which network services a subscriber can access, at what bandwidth level, when, and for how long. The PCRF may identify appropriate policy rules by querying a subscription profile repository (SPR) for relevant policy information and may enforce them by sending them to a policy enforcement node, such as a policy and charging enforcement function (PCEF).

Generally, policy information is retrieved or provided in response to one or more policy event triggers, such as a subscriber requesting a service via the Internet. By analyzing policy information and associated policy event triggers, network operators may perform various actions. For example, a network operator may analyze policy information and associated policy event triggers and may use this information to improve quality of service and to increase revenue.

Accordingly, a need exists for methods, systems, and computer readable media for policy event record generation.

SUMMARY

According to one aspect, the subject matter described herein includes a method for generating a policy event record (PER). The method includes receiving one or more policy event attributes (PEAs) and using the received PEAs to select one or more policy definitions that are associated with a communication session. The method also includes analyzing the selected one or more policy definitions and initiating one or more associated policy actions. The method further includes generating a policy event record that includes information that identifies the one or more selected policy definitions.

A system for generating a PER is also disclosed. The system includes a policy definition selection module (PDSM) configured to receive one or more policy event attributes (PEAs) and using the received PEAs to select one or more policy definitions that are associated with a communication session. The system also includes a policy action module (PAM) configured to analyze the selected one or more policy definitions and to initiate one or more associated policy actions. The system further includes a PER module (PERM) configured to generate a policy event record that includes information that identifies the one or more selected policy definitions.

The subject matter described herein for generating a PER may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which:

FIG. 6 is a diagram illustrating an exemplary PER data according to an embodiment of the subject matter described herein;

FIG. 8 is a diagram illustrating exemplary data usage statistics according to an embodiment of the subject matter described herein.

DETAILED DESCRIPTION

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
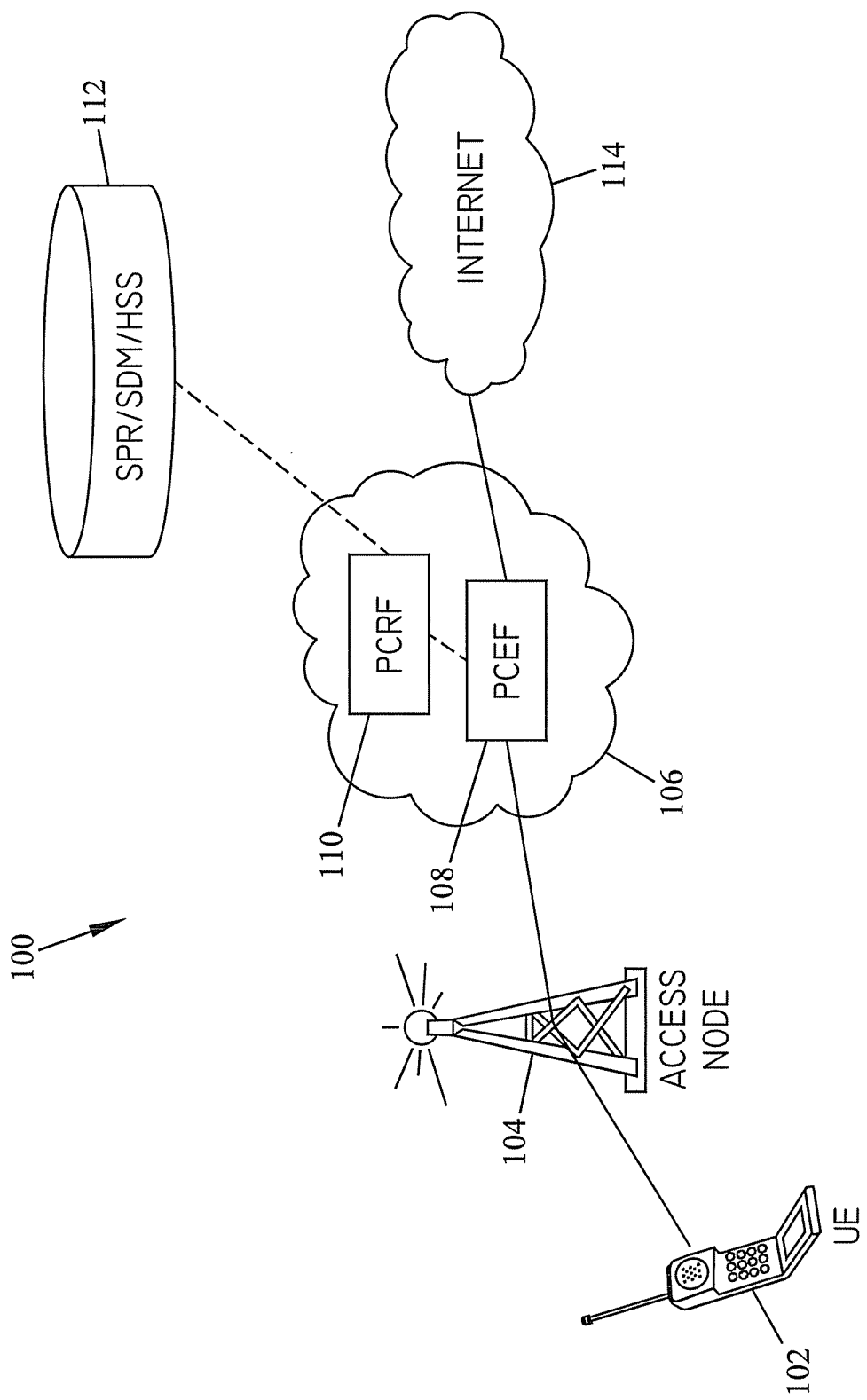
FIG. 1 is a diagram illustrating an exemplary network for generating a PER according to an embodiment of the subject matter described herein.

FIG. 1 is a diagram illustrating an exemplary network for generating a PER according to an embodiment of the subject matter described herein. Referring to FIG. 1, network 100 may include user equipment (UE) 102, an access node (AN) 104 (e.g., a base transceiver station (BTS) or evolved node b (e node b)), a core network 106, and Internet 114.

UE 102 represents a device, such as a mobile handset, for communicating with one or more portions of network 100. For example, UEs 102 may include a computer, a pager, a smartphone, a phone, a wireless modem, a hotspot, a computing platform, a mobile handset, and other subscriber devices.

UE 102 may communicate with access node 104. Access node 104 may be located within an access network (not shown). An access network may include nodes, functions, devices, and/or components for providing a UE 102 access to services, functions, or devices in one or more networks (e.g., core network 106). For example, an access network may include a radio access network (RAN) or other access network, such as a Global System for Mobile Communications (GSM) RAN (GRAN), a GSM enhanced data rates for GSM evolution (EDGE) RAN (GERAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an Evolution-Data Optimized (EV-DO), a wideband CDMA (WCDMA) network, a High Speed Packet Access (HSPA) network, or an evolved HSPA (eHSPA+) network.

Access node 104 may perform radio access functions for connecting UE 102 with various communications networks and/or nodes. Access node 104 may communicate with core network 106 using gateway functionality. For example, access node 104 or other node (e.g., a gateway) may communicate messages (e.g., authentication or mobility related messages) to one or more nodes within the core network 106.

Core network 106 may be a network for providing services UE 102. For example, core network 106 may perform network aggregation, charging, and authentication functions for UE 102. In one embodiment, core network 106 may be at least one of a 3G network, a 3G+ network, a GSM network, a 4G network, an LTE network, an EPC network, a 3rd Generation Partnership Project (3GPP) network, a GPRS core network, or other network.

Core network 106 may include a policy and charging enforcement function (PCEF) 108 and a PCRF 110. Core network 106 may also include other nodes, such as a subscription profile repository (SPR), a Diameter relay agent and/or a Diameter signaling router (DRA/DSR), a mobility management entity (MME), a home subscriber server (HSS), an authentication, authorization, and accounting (AAA) server, and a bearer binding and event reporting function (BBERF).

PCEF 108 may be any suitable entity for generating and/or enforcing policies (e.g., one or more policy rules). PCEF 108 may include functionality located at a gateway (e.g., a packet data network (PDN) gateway) or other node for communicating between networks, e.g., Internet 114. In one embodiment, PCEF 108 manages and enforces policy and charging control (PCC) rules provided by PCRF 110. For example, rules may be provided for each session data flow (SDF) and/or UE 102 attempting to use PCEF 108. In this example, PCEF 108 may control access to external networks and charge for such access based on policies that include rules received from PCRF 110.

In some embodiments, PCEF 108 may include or be integrated with a gateway GPRS support node (GGSN) for communicating between a GPRS network and external networks, e.g., Internet 126 or private network 128. For example, in an embodiment where core network 106 includes a GPRS core network, PCEF 108 may include a GGSN. PCEF 108 may communicate with serving GPRS support node (SGSN) or other gateway for providing services to UE 102. For example, PCEF 108 may request and receive PCC rules from PCRF 110. Using the PCC rules, PCEF 108 may control access to external networks and charge for such access based on the PCC rules. For example, for an SDF (e.g., one or more related packets) that is under policy control, PCEF 108 may allow the SDF to pass through the node if the corresponding gate is open (e.g., as determined by one or more relevant PCC rules). For an SDF that is under charging control, PCEF 108 may allow the SDF to pass through the node if there is a corresponding active PCC rule and, for online charging, the OCS has authorized the applicable credit with that charging key. PCEF 108 may let an SDF pass through the gateway during the course of the credit re-authorization procedure. If requested by PCRF 110, PCEF 108 may report to PCRF 110 when the status of the related SDF changes, which can be used to, monitor an IP-CAN bearer path dedicated for AF signaling traffic.

PCEF 108 may also include a BBERF. The BBERF may be any suitable entity for performing bearer binding and/or event reporting. In one embodiment, the BBERF may control user plane traffic. For example, the BBERF may ensure that an SDF is carried over a bearer path with an appropriate quality of service and may perform resource reservation. The BBERF may also provide event reporting to one or more nodes in network 100. For example, the BBERF may inform PCRF 110 of various network or bearer-related events, e.g., based on triggers installed or requested by PCRF 110.

In some embodiments, PCEF 108 may include a PER module (PERM) for generating one or more PERs. A PER may include information associated with a policy event trigger, such as policy event attributes (PEAs) and policies identifiers of policies that are performed or to be performed in response to the policy event trigger. Exemplary policy event triggers may include a session create, a session modify, a session update, or a session delete request or answer message. Exemplary PEAs may include an event type, a policy identifier (ID), a radio access technology (RAT) type, an Internet protocol (IP) connectivity access network (IP-CAN) type, a serving mobile country code (MCC), a serving mobile network code (MNC), a session ID, an application ID, a peer identity, a user ID, a user IPv4 address, a user IPv6 address, a called station ID, a mobility protocol, a tier, and/or an event triggers mask.

In some embodiments, a PERM may generate PERs based on a policy context object or using information from a policy context object. A policy context object may be a data structure that stores relevant policy event information and may be generated in response to a policy event trigger. For example, a policy context object may include PEAs and may be inspected to determine whether a policy is to be enforced. In some embodiments where a policy context object is stored at PCRF 110 or another module separate from PCEF 108, policy context information (e.g., policy definitions) may be sent (e.g., from PCRF 110) to PCEF 108 via a PER interface. After generating a PER using the policy context information, the PERM may send the PER to other nodes, such as an NMS or an accounting system.

PCRF 110 may be any suitable entity for creating, selecting, or otherwise determining policies (e.g., one or more PCC rules). For example, PCRF 110 may be a stand-alone node, e.g., a policy server or a multimedia policy engine (MPE), or may be co-located or integrated with one or more nodes in network 100, e.g., a DRA/DSR. PCRF 110 may inform PCEF 108, through the use of PCC rules, on the treatment of each SDF that is under PCC control, in accordance with policy decisions. In performing policy decisions, PCRF 110 may communicate with one or more nodes in network 100 for gathering subscription related information. For example, PCRF 110 may communicate with SPR, a subscription data module (SDM), and/or an HSS (SPR/SDM/HSS) 112 to retrieve policy information. In another example, PCRF 110 may communicate with a network management system (NMS), e.g., via a simple network management protocol (SNMP) interface. In this example, PCRF 110 may poll or otherwise query the NMS or a related database to receive information, e.g., regarding the state of one or more devices in an access network, core network, or other network.

Subscription related information may be used (e.g., by PCRF 110) to generate PCC rules. PCC rules typically include information for managing user plane traffic (e.g., data packets). For example, a PCC rule may include a rule name, service identifier, SDF filter(s), precedence information, gate status, QoS parameters, charging key (i.e., rating group), other charging parameters, and/or monitoring key. The rule name or PCC rule identifier may be used to reference a PCC rule in the communication between the PCEF and the PCRF and may be unique for each PCC rule used during a IP-CAN session. The service identifier may be used to identify the service or the service component to which the SDF relates. The SDF filter(s) may be used to select the traffic for which the rule applies. For example, an SDF filter make take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). In this example, packets containing information matching the IP five-tuple may be considered part of the SDF for which the corresponding PCC rule is to be applied. In another example, an SDF filter may be based on fewer, different, and/or additional criteria. For instance, UE 102 or another node in network 100 may assign an SDF identifier (e.g., a value) to packets in a custom parameter field. In this instance, an SDF filter in a PCC rule may use this parameter for determining traffic for which the rule applies.

PCC policy decisions may be based on one or more of the following: information obtained from an AF via the Rx interface (e.g., session, media, and subscriber related information), information obtained from PCEF 108 (e.g., Internet Protocol Connectivity Access Network (IP-CAN) bearer attributes, request type, device information, and subscriber related information), information obtained from SPR/SDM/HSS 112 (e.g., subscriber and service related data), and pre-configured information. If the information from PCEF 108 contains traffic mapping information not matching any SDF filter known to PCRF 110, and PCRF 110 allows the UE to request enhanced QoS for services not known to PCRF 110, PCRF 110 may add the traffic mapping information as SDF filters to the corresponding authorized PCC rule. PCRF 110 may wildcard missing filter parameters, e.g., missing uplink TFT address and port information in case of GPRS. For example, a blank or "wildcard" filter (e.g., port number="*") may consider any value (including an empty or zero value) as matching the filter criteria.

Applying a policy may be part of either a PULL or a PUSH procedure. A PULL procedure may occur when provisioning is solicited by PCEF 108. For example, in response to a request for PCC rules being made by PCEF 108, PCRF 110 may provision PCC rules using a credit control answer (CCA) message. A PUSH procedure may occur when provisioning is unsolicited. For example, PCRF 110 may decide to provision PCC rules without obtaining a request from PCEF 108, e.g., in response to information provided to PCRF 110 from an AF via the Rx interface, or in response to an internal trigger within PCRF 110. In order to provision PCC rules without a request from PCEF 108, PCRF 110 may include the PCC rules in a re-authentication request or answer message.

In some embodiments, PCRF 110 may include a PERM for generating one or more PERs. The PERM may generate PERs based on or using information from a policy context object. In some embodiments where a policy context object is stored at PCEF 108 or another module separate from PCRF 110, policy context information (e.g., policy definitions) may be sent (e.g., from PCEF 108) to PCRF 110 via a PER interface. After generating a PER using the policy context information, the PERM may send the PER to other nodes, such as an NMS or an accounting system. The PERs may be sent to nodes using various interfaces, such as a PER interface or an IP interface.

SPR/SDM/HSS 112 represent one or more suitable entities for storing or maintaining subscription related information, such as subscription profiles, policy information, and/or PCC rules. For example, SPR/SDM/HSS 112 may include a database, an HSS, an AAA, an SPR, or other node. SPR/SDM/HSS 112 may store policy information for use by PCRF 110 in making policy decisions. In one embodiment, a subscription profile may include authorization information, charging information, subscription information (e.g., access or service tiers), and quality of service (QoS) information associated with a subscriber, session, device, and/or an SDF. For example, a subscription profile may include information on a subscriber's permitted services, service pre-emption priorities, allowed QoS, and charging related data information for different types of SDFs.

SPR/SDM/HSS 112 may communicate with PCRF 110 and various other nodes, e.g., a HSS, an AAA, an MME and or a DRA/DSR. SPR/SDM/HSS 112 may be located external to or distinct from PCRF 110 or may be co-located or integrated with PCRF 110. For example, some SPRs may be located in various locations (e.g., networks) distinct from PCRF 110 and another SPRs may be co-located or integrated with PCRF 110 or another node in network 100.

SPR/SDM/HSS 112 may store policy information based on SDFs and/or other information (e.g., device information and/or subscriber identifiers). For example, in network 100, SPRs may be provisioned policy information based on device information and/or subscriber information and SDF information. For instance, policy information for users of 4G-capable smartphones may be stored in SPRs 1-3, while policy information for users of 3G-capable smartphones may be stored in SPRs 4-15 and policy information for top-tier data subscribers are stored in SPRs 16-20.

Policy information stored in SPR/SDM/HSS 112 may be indexed by similar information (e.g., SDF identifiers, device information, and/or subscriber identifiers. For example, PCRF 112 or a proxy (e.g., a message router) may send a query message to SPR/SDM/HSS 112. The query message may include a subscriber identifier and/or an SDF identifier. Using one or both of the identifiers from the query message, SPR/SDM/HSS 112 may determine corresponding policy information and provide the information to PCRF 110 or a proxy.

It will be appreciated that FIG. 1 is for illustrative purposes and that various nodes, their locations, and/or their functions may be changed, altered, added, or removed. For example, some nodes and/or functions may be combined into a single entity, e.g., an SPR and PCRF 110 may be included in an MPE. In a second example, a node and/or function may be located at or implemented by two or more nodes.

Figure 2:
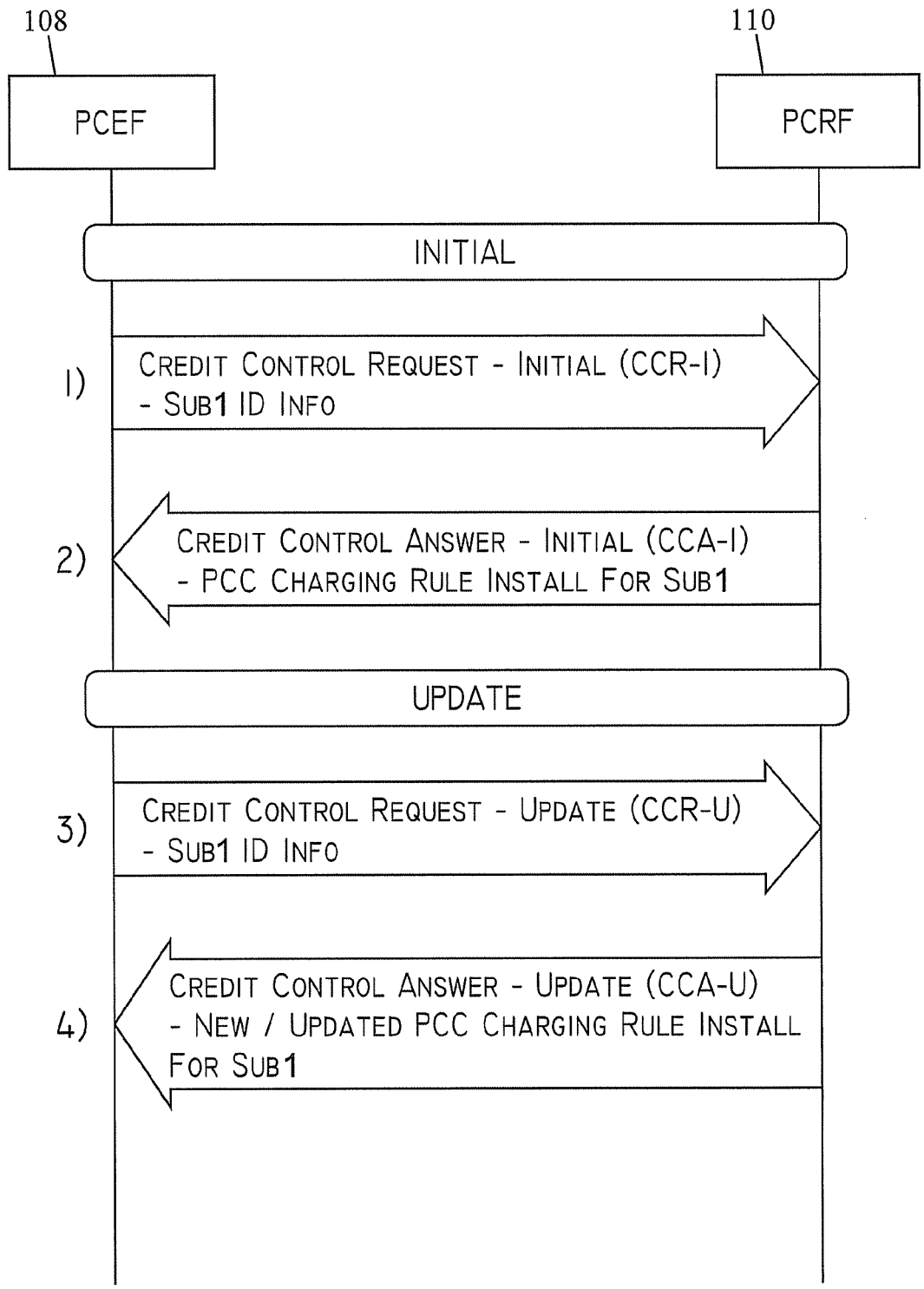
FIG. 2 is a diagram illustrating exemplary communications between a PCRF and a PCEF according to an embodiment of the subject matter described herein.

FIG. 2 is a diagram illustrating exemplary communications between PCRF 110 and PCEF 108 according to an embodiment of the subject matter described herein. Referring to FIG. 2, PCRF 110 may include one or more communications interfaces for communicating messages.

In step 1, PCEF 108, such as a GGSN node in a 3G or LTE network, may initially request policy and charging instructions from PCRF 110 via a CCR initial (CCR-I) message. A CCR-I message may include information (e.g., an attribute) that identifies the mobile subscriber with which the request is associated. PCRF 110 may receive, analyze, and/or process the CCR-I message. For example, PCRF 110 may extract one or more attributes from the CCR-I message, such as a subscriber ID, and may use the attributes to identify one or more PCC rules to be installed at PCEF 108.

In step 2, PCRF 110 may send a credit control answer initial (CCA-I) message which includes one or more PCC rules that are to be installed at PCEF 108.

In some embodiments, update messages may be communicated between PCEF 108 and PCRF 110. Update messages may be used when certain conditions occur (e.g., after a time period has expired or after a handover procedure) and may modify PCC rules for an existing communications session.

In step 3, PCEF 108 may request policy and charging instructions for an existing communications session from PCRF 110 via a CCR update (CCR-U) message. A CCR-U message may include information that identifies the mobile subscriber with which the request is associated. PCRF 110 may receive, analyze, and/or process the CCR-U message.

In step 4, PCRF 110 may send a credit control answer update (CCA-I) message which includes one or more PCC rules that are to be installed at PCEF 108.

While FIG. 2 depicts CCR and CCA messages, it will be appreciated that other messages (e.g., a re-authorization request (RAR) message or a session terminate request (STR) message) may be communicated between PCEF 108 and PCRF 110 and that such messages may be associated with and/or initiate policy event triggers.

Figure 3:
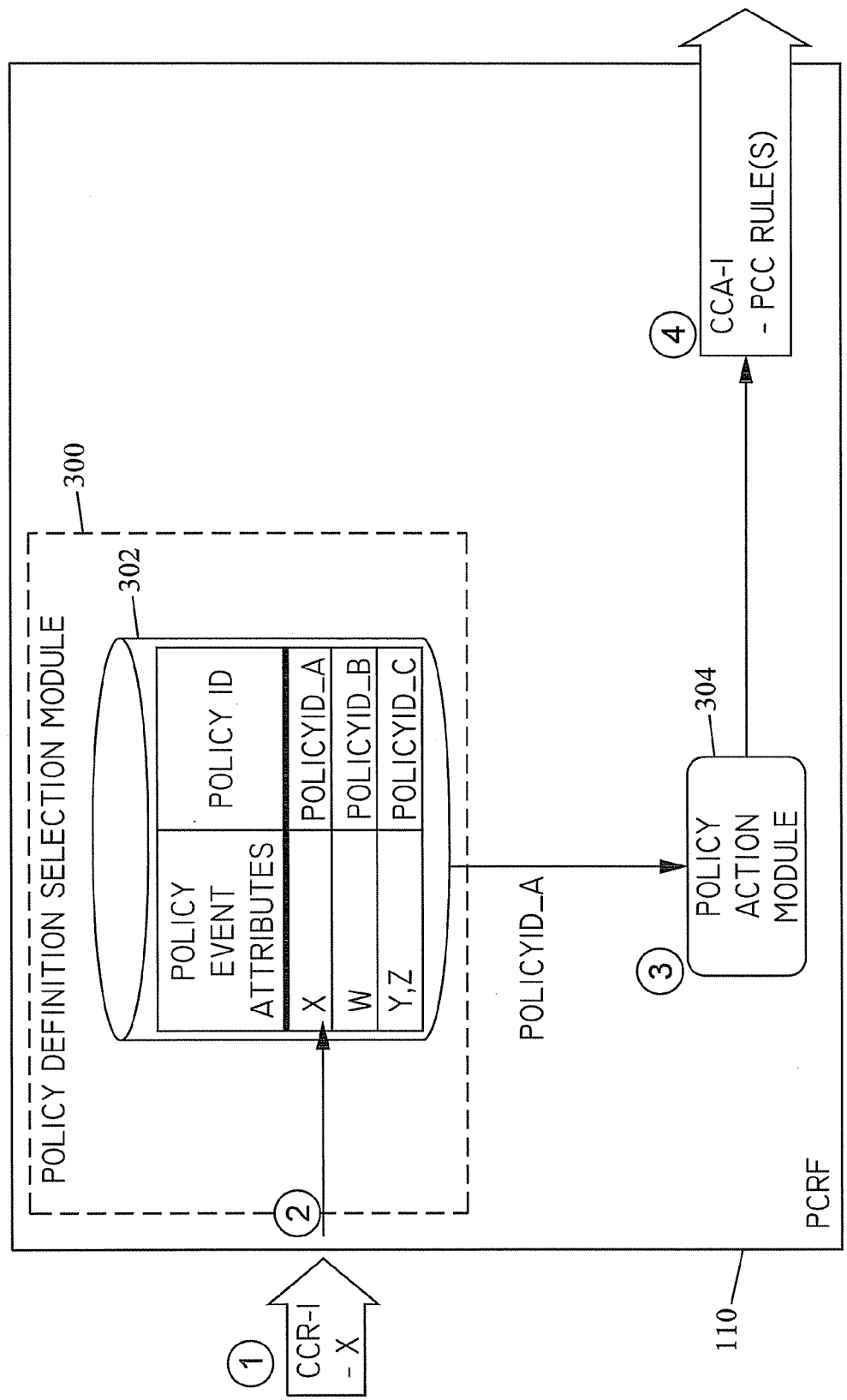
FIG. 3 is a diagram illustrating an exemplary PCRF according to an embodiment of the subject matter described herein.

FIG. 3 is a diagram illustrating PCRF 110 according to an embodiment of the subject matter described herein. PCRF 110 may include a policy definition selection module (PDSM) 300 and a policy action module (PAM) 304. PDSM 300 may be configured to receive one or more PEAs and select, using the received PEAs, one or more policy definitions that are associated with a communication session. PAM 304 may be configured to analyze one or more policy definitions and to initiate one or more associated policy actions.

PCRF 110 or a module therein may include one or more communications interfaces for communicating messages (e.g., via a Gx interface, Gxx interface, Sp interface, an extensible markup language (XML) interface, a session initiation protocol (SIP) interface, a SOAP interface, or a hypertext transfer protocol (HTTP) interface or others). For example, a credit control request (CCR) may be received via a Gx interface from PCEF 108 for requesting policy information (e.g., PCC rules). In another example, PCRF 110 or a module therein may receive a policy request message via an HTTP or SIP interface from an IMS node. In yet another example, PCRF 110 may include one or more interfaces (e.g., Sp, SOAP, or HTTP) for communicating with SPR/SDM/HSS 112.

Referring to FIG. 3, prior to step 1, PCEF 108 may establish a session for subscriber ID X through an IP Connectivity Access Network (e.g., a WLAN). IP-CAN is a collection of network entities and interfaces that provides IP transport connectivity between UEs and core network entities. In one exemplary IP-CAN session establishment scenario, PCEF 108 may receive an IP-CAN session creation request. The IP-CAN session creation request may be a GTP message or a trigger message.

In response to the IP-CAN session creation request, in step 1, PCEF 108 (e.g., PDN gateway or GGSN) may send a Gx message to PCRF 110 (e.g., a policy server). For example, the Gx message may be any message, such as a CCR-I message, communicated via a Gx interface for requesting policies to be applied to the IP-CAN session. The Gx message may be for requesting PCC rules and may include various request attributes, also referred to herein as PEAs.

In step 2, PDSM 300 may extract one or more PEAs from the received message. PDSM 300 may use the extracted information in selecting and/or identifying one or more policy definitions. For example, PDSM 300 may include a policy data structure 302 that associates PEAs and policy identifiers. In this example, after determining policy identifiers, an additional data structure may be queried to retrieve additional information, such as PCC rules associated with relevant policy identifiers. In another example, policy data structure 302 may include policy definitions in addition to policy identifiers.

In some embodiments, a policy definition may include a predicate section and an action section. A predicate section may include one or more conditions or predicates that may be met before a policy action is initiated. In some embodiments, a policy, or portions therein (e.g., individual actions or PCC rules), may be enforced based on which predicates are met. For example, if no predicate associated with a policy is met, all policy actions associated with the policy may be skipped. In another example, if all predicates associated with a policy are met, all policy actions associated with the policy may be executed. In some embodiments, certain policy actions may be executed before, after, or simultaneously with other policy actions. For example, in some scenarios, all optional policy actions may be executed prior to a mandatory policy action. In another example, policy actions may be executed based on a predetermined order, a priority value, or randomly.

An action section may include one or more actions that are performed if one or more conditions in the predicate section are met. In some embodiments, an action section may include one mandatory policy action and zero or more optional policy actions. A mandatory policy action may include various actions, such as accepting a request, rejecting a request, or continuing processing policies. Some mandatory policy actions may be terminal events that result in the termination of a current policy, such as accepting or rejecting a request. An optional policy action may include various actions, such as installing a PCC rule, removing a PCC rule, logging an event, or updating a quota.

In some embodiments, when a policy event trigger occurs (e.g., an event that causes PCRF 110 to select PCC rules), a policy context object may be created. For example, receiving a credit control request initial (CCR-I) message at PCRF 108 may be a policy event trigger. In another example, receiving an IP-CAN session creation request message at PCEF 108 may be a policy event trigger. In response to a policy event trigger, PCRF 110 or another module may generate a policy context object and may store information that identifies the event (e.g., user identification, policy event trigger(s), PEAs, etc.) in the policy context object.

In some embodiments, a policy context object may include policy identifiers of policies associated with the event. For example, PCEF 108 or another module may consult the policy context object when making policy decisions by comparing PEAs stored in the policy context object and predicate conditions of the policy. If the current request attributes and predicate conditions of the policy match, a policy identifier associated with the policy may be stored at the policy context object (e.g., in a policy event trace list). In this example, the policy identifiers in the policy context object may indicate all policies that are executed or are to be executed in response to a policy event trigger. That is, a policy event trace list at a policy context object may identify all policies enforced or to be enforced for a given policy event.

In step 3, PAM 304 may receive a selected policy definition from PDSM 300. PAM 304 may analyze the selected policy definition and may determine one or more policy actions to initiate. For example, if PAM 304 determines that a policy definition is to be enforced, PAM 304 may generate a PCC rule and provide the PCC rule to PCEF 108. In another example, PAM 304 may send a session reject message or a session accept message. In yet another example, PAM 304 may generate an inspection trigger (IT) message and send the IT message to a deep packet inspection (DPI) module. In response to the IT message, the DPI module may be configured to inspect one or more messages associated with the communications session.

In step 4, PAM 304 may generate a CCA-I message that includes one or more PCC rules. The CCA-I message may be sent to PCEF 108 or another module for installation and enforcement.

Figure 4:
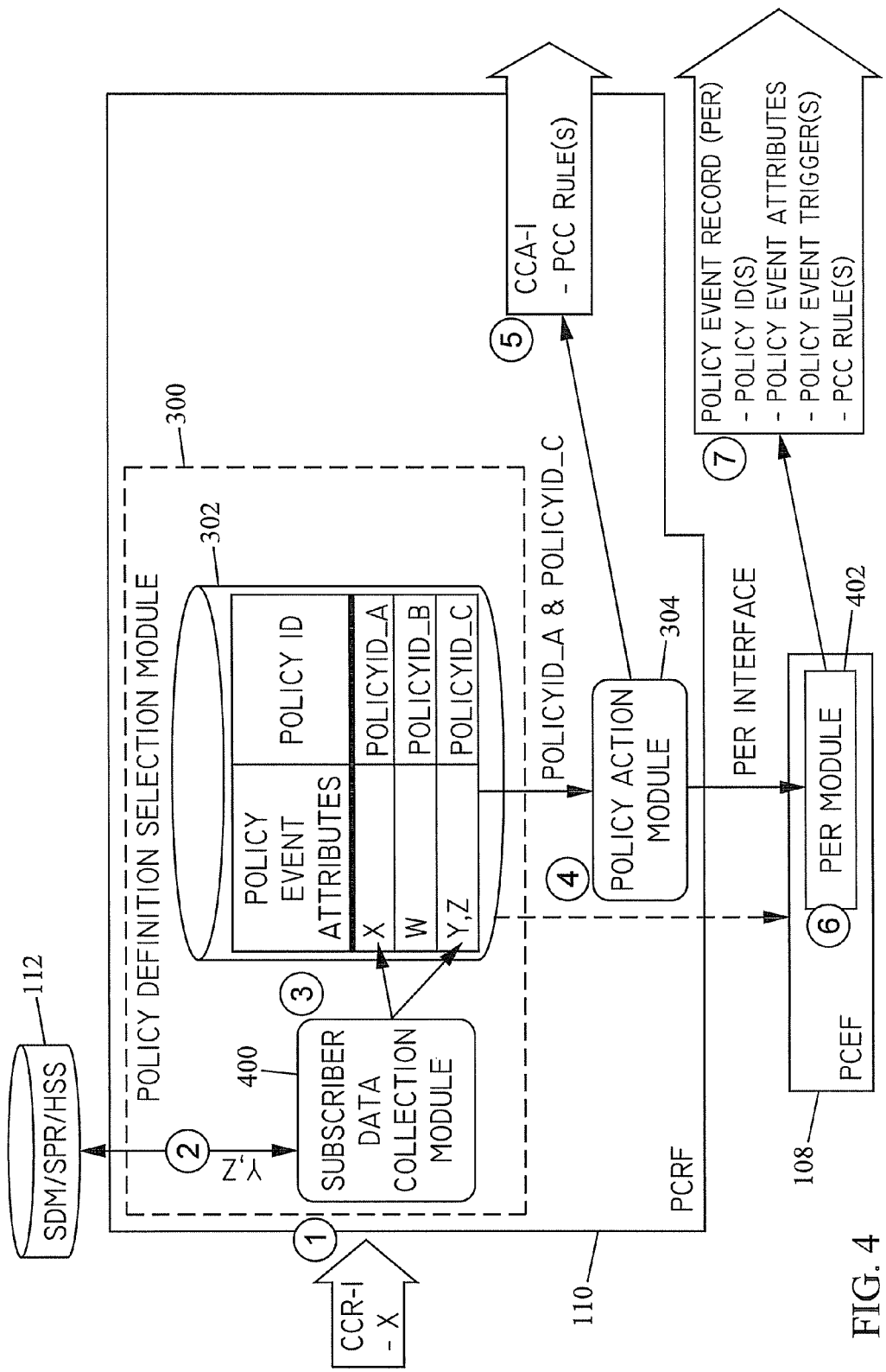
FIG. 4 is a diagram illustrating an exemplary PCRF and exemplary PCEF according to another embodiment of the subject matter described herein.

FIG. 4 is a diagram illustrating PCRF 110 and PCEF 108 according to another embodiment of the subject matter described herein. PCRF 110 may include a PDSM 300 and PAM 304. PCRF 110 or a module therein may include one or more communications interfaces for communicating messages.

PCEF 108 may include PERM 402 for generating PERs based on policy information, such as policy event triggers, PEAs, and PCC rules. In some embodiments, policy information may be communicated between PCEF 108 and PCRF 110 via a PER interface or other interface.

Referring to FIG. 4, prior to step 1, PCEF 108 may establish a session for subscriber ID X through an IP-CAN. In one exemplary IP-CAN session establishment scenario, PCEF 108 may receive an IP-CAN session creation request. The IP-CAN session creation request may be a GTP message or a trigger message.

In response to the IP-CAN session creation request, in step 1, PCEF 108 may send a CCR-I message to PCRF 110.

In step 2, a subscriber data collection module (SDCM) 400 may receive the CCR-I message and may query one or more nodes to obtain relevant subscriber information. For example, one or more PEAs (e.g., "X", such as a user ID) from a CCR-I message may be provided to SDM/SPR/HSS 112. Using the one or more PEAs from the CCR-I message, SDM/SPR/HSS 112 may identify additional PEAs (e.g., "Y" and "Z", such as a tier identifier and an account status identifier) and provide the additional PEAs to SDCM 400. SDCM 400 may use PEAs collected from the one or more nodes and PEAs from the CCR-I message to identify relevant policies.

In an alternative embodiment, SDCM 400 may consult local subscriber information storage instead of querying remote nodes. In yet another embodiment, SDCM 400 and/or step 2 may be omitted.

In step 3, SDCM 400 or another module may use one or more PEAs in selecting and/or identifying one or more policy definitions. For example, PDSM 300 may include a policy data structure 302 that associates PEAs and policies.

In step 4, PAM 304 may receive a selected policy definition from PDSM 300. PAM 304 may analyze the selected policy definition and may determine one or more policy actions to initiate.

In step 5, PAM 304 may generate a CCA-I message that includes one or more PCC rules. The CCA-I message may be sent to PCEF 108 or another module for installation and enforcement.

In step 6, PERM 402 may receive policy information and may generate a PER. For example, policy information may be received from one or more modules or nodes, such as PAM 304 and PDSM 300. For example, information associated with PEAs "X", "Y", and "Z" may be communicated to PERM 402 along with information associated with policy definitions and information associated with the PCC rule(s) that were generated by PAM 304. PERM 402 may be adapted to generate one or more PERs that may include some or all of the obtained policy information.

In some embodiments, a policy context object or information associated with a policy context object may be provided to PERM 402. PERM 402 may use information associated with the policy context object, such as policy event triggers, PEAs, and a policy event trace list, to generate one or more PERs. For example, PERM 402 may extract fields or other information from a policy context object and encode them as type-length-value (TLV) elements and encapsulate the TLV elements in an IP packet or other format, such as a proprietary packet format.

In some embodiments, PERM 402 may be located at PCEF 108 and may receive policy information from PCRF 110 via a PER interface.

In step 8, a generated PER may be communicated from PERM 402 to one or more nodes, such as an NMS for analysis. For example, after a PER record is generated, PERM 402 may send the PER via one or more communications interfaces and/or protocols.

Figure 5:
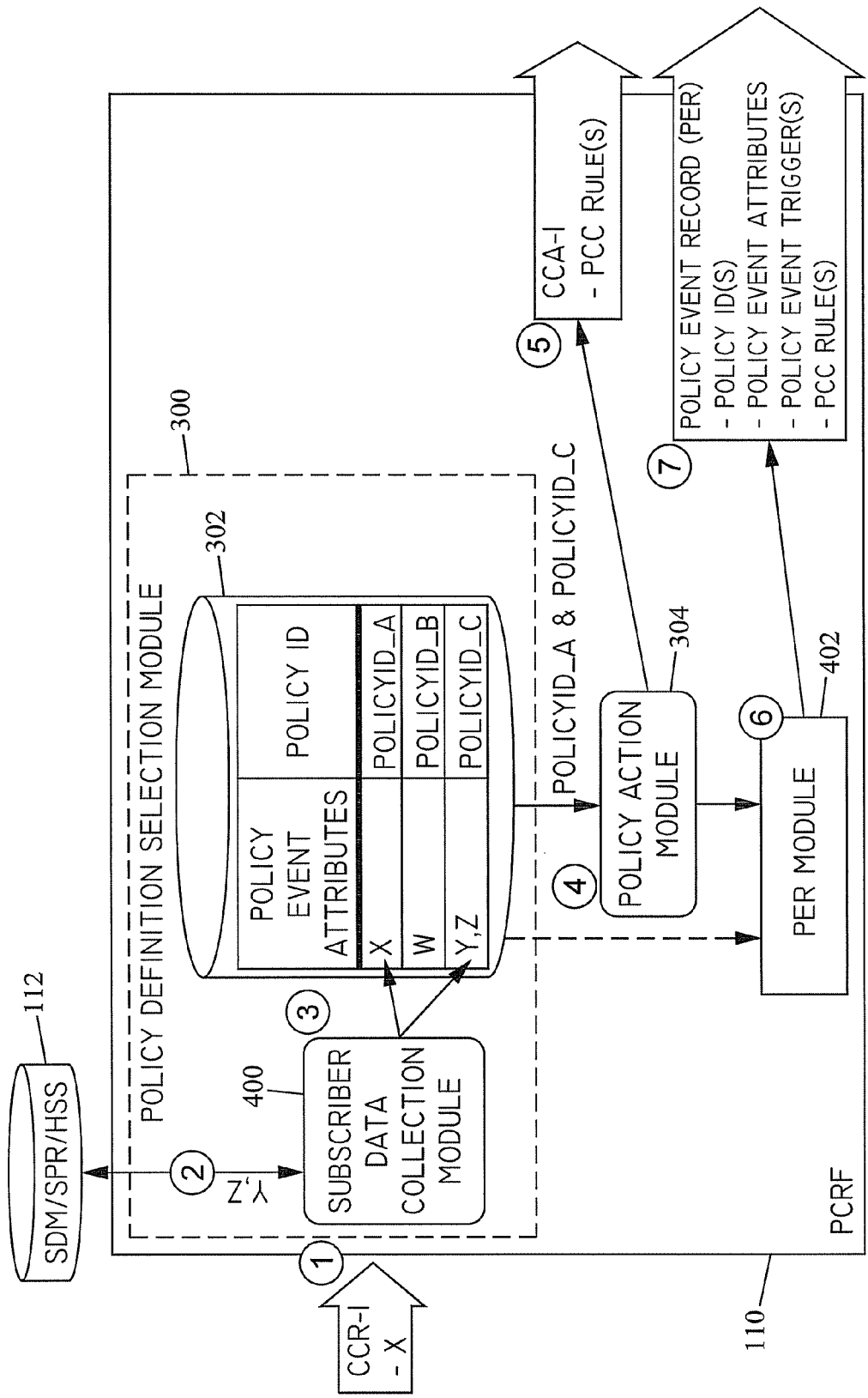
FIG. 5 is a diagram illustrating an exemplary PCRF according to another embodiment of the subject matter described herein.

FIG. 5 is a diagram illustrating exemplary PCRF 110 according to another embodiment of the subject matter described herein. PCRF 110 may include PDSM 300, PAM 304, and PERM 402. PCRF 110 or a module therein may include one or more communications interfaces for communicating messages.

Referring to FIG. 5, prior to step 1, PCEF 108 may establish a session for subscriber ID X through an IP-CAN. In one exemplary IP-CAN session establishment scenario, PCEF 108 may receive an IP-CAN session creation request. The IP-CAN session creation request may be a GTP message or a trigger message.

In response to the IP-CAN session creation request, in step 1, PCEF 108 may send a CCR-I message to PCRF 110.

In step 2, a subscriber data collection module (SDCM) 400 may receive the CCR-I message and may query one or more nodes to obtain relevant subscriber information. SDCM 400 may use PEAs collected from the one or more nodes and PEAs from the CCR-1 message to identify relevant policies.

In an alternative embodiment, SDCM 400 may consult local subscriber information storage instead of querying remote nodes. In yet another embodiment, SDCM 400 and/or step 2 may be omitted.

In step 3, SDCM 400 or another module may use one or more PEAs in selecting and/or identifying one or more policy definitions.

In step 4, PAM 304 may receive a selected policy definition from PDSM 300. PAM 304 may analyze the selected policy definition and may determine one or more policy actions to initiate.

In step 5, PAM 304 may generate a CCA-I message that includes one or more PCC rules. The CCA-I message may be sent to PCEF 108 or another module for installation and enforcement.

In step 6, PERM 402 may receive policy information and may generate a PER. For example, policy information may be received from one or more modules or nodes, such as PAM 304 and PDSM 300. PERM 402 may be adapted to generate one or more PERs that may include some or all of the obtained policy information.

In some embodiments, a policy context object or information associated with a policy context object may be provided to PERM 402. PERM 402 may use information associated with the policy context object, such as policy event triggers, PEAs, and a policy event trace list, to generate one or more PERs.

In step 7, a generated PER record may be communicated to one or more nodes, such as an NMS for analysis.

FIG. 6 is a diagram illustrating exemplary PER data according to an embodiment of the subject matter described herein. As shown in FIG. 6, a PER portion 600 may include a MFP header portion and one or more PER TLV elements. The MFP header portion include various fields or sections, such as a MFP length field, a timestamp field, a payload size field, a channel field, a type field, and a way field.

PER portion 600 may also include a payload portion containing one or more PER TLV elements. For example, a PER may include mandatory TLV elements, such as a version and a timestamp. A PER may also include TLV elements associated with PEAs, such as a user ID, a RAT type, a IP-CAN type, a MCC-MNC, an event type, a session ID, an application ID, and a peer ID. A PER may also include TLV elements including one or more policy IDs. In some embodiments, a PER may include duplicate TLV elements or may omit TLV elements related to certain PEAs if those PEAs are not associated with the policy event.

Figure 7:
FIG. 7 is a diagram illustrating exemplary policy group statistics according to an embodiment of the subject matter described herein.

FIG. 7 is a diagram illustrating exemplary policy group statistics according to an embodiment of the subject matter described herein. Table 700 may represent an exemplary data structure based on multiple PERs associated with numerous services. For example, an NMS or an accounting module may analyze numerous received PERs to identify how many policy events are associated with certain services. In this example, policy events associated with similar services and having similar PCC rules may be considered policy groups. As such, the PERs may be used to identify a policy group and identify effects the policy group may have on network resources, revenue, or other dynamics.

As depicted in FIG. 7, table 700 includes a ranking current (current) field, a ranking last (month) field, a policy group number field, a policy group name field, a total execution March 2011 field, a total execution April 2011 field, and a difference field. For example, table 700 may indicate that a policy group associated with Netflix service is the most popular (frequently executed) policy group and that the policy group has experienced a 500% increase between March 2011 and April 2011. Using this information, network operators (or sales executives) may determine whether to change policies that affect this particular group, such as whether to charge more for this service, whether to blacklist this service, or whether to increase or decrease a priority level associated with this policy group.

FIG. 8 is a diagram illustrating exemplary data usage statistics according to an embodiment of the subject matter described herein. Table 800 may represent an exemplary data structure based on multiple PERs associated with numerous services. For example, an NMS or an accounting module may analyze numerous received PERs to identify data usage and utilization of data quotas for subscribers in certain tiers.

As depicted in FIG. 8, table 800 includes a tier field, a monthly quota field, an average usage field, a number of subscribers field, a <=10% (of usage) field, a >10% & <=80% (of usage) field, a >80% & <=100% (of usage) field, a >100% (of usage) field, and an upgraded field. For example, table 800 may indicate that very few platinum tier subscribers reached their quota limits but that bronze tier subscribers are more likely than any other tier to reach their quota limits and are more likely to upgrade to a greater tier. Using this information, network operators (or sales executives) may determine whether to change policies that affect quotas of certain tiers. For example, by studying the data, marketing executives may attempt to sell higher tiers to subscribers of lower tiers or subscribers that use 80% or more of their current data quota.

Figure 9:
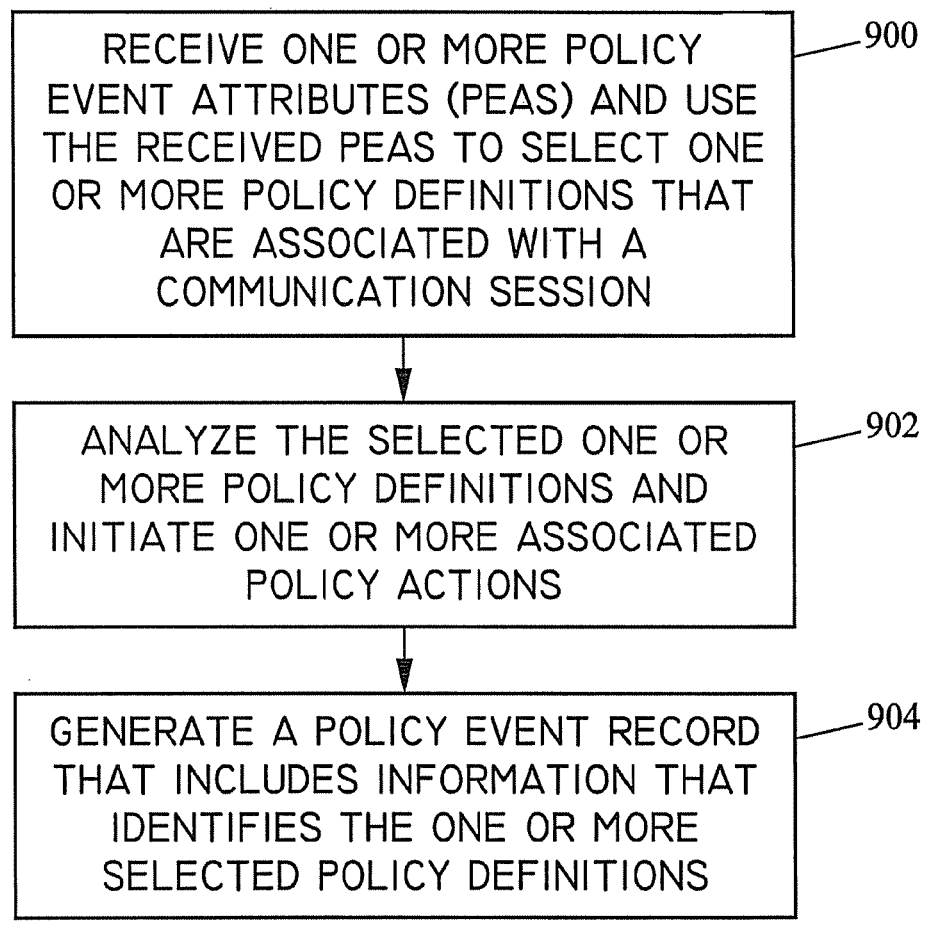
FIG. 9 is flow chart illustrating exemplary steps for generating a PER according to an embodiment of the subject matter described herein.

FIG. 9 is a flow chart illustrating an exemplary process for generating a PER according to an embodiment of the subject matter described herein. In some embodiments, the exemplary process described herein, or portions thereof, may be performed by PCEF 108, PCRF 110, and/or another module or node.

Referring to FIG. 9, in step 900, one or more PEAS may be received and the one or more PEAs may be used to select one or more policy definitions that are associated with a communication session. For example, a CCR-I message may be received at PDSM 300. PDSM 300 may query, using PEAs stored in the CCR-I message, one or more data structures and may identify one or more relevant policies.

In some embodiments, an attribute (e.g., a PEA) may include an event type, a policy identifier (ID), a RAT type, an IP-CAN type, a MCC, a serving MNC, a session ID, an application ID, a peer identity, a user ID, a user IPv4 address, a user IPv6 address, a called station ID, a mobility protocol, a tier, or an event triggers mask.

In step 902, the selected one or more policy definitions are analyzed and one or more associated policy actions are initiated. For example, PAM 304 may receive policy definitions. After analyzing the policy definitions, various policy actions may be initiated or performed.

In some embodiments, initiating one or more associated policy actions may include generating a PCC rule, updating a user quota, accepting a session, rejecting a session, or signaling a deep packet inspection (DPI) module.

In step 904, a policy event record may be generated that includes information that identifies the one or more selected policy definitions. For example, PDSM 300, PAM 304, or another module may provide policy information to PERM 402.

In some embodiments, the policy information may be based on information in a policy context object. The policy information may be provided via a PER interface. PERM 402 may send PERs to other nodes, such as a network operations control center, an NMS, an accounting system, a diagnostics system or other system for human-operator viewing, logging, storage, future retrieval, post-processing analysis, network engineering analysis or policy engineering analysis.

In some embodiments, a PER may include information that identifies the one or more associated policy actions. In some embodiments, a PER may include information that identifies the one or more associated PEAs.

In some embodiments, the exemplary process (e.g., steps 900-904) may occur at or is performed by a PCRF module.

In some embodiments, the receiving, the analyzing, and the initiating (e.g., steps 900-902) may occur at or may be performed by a PCRF module and the generating (e.g., steps 904) may occur at or may be performed by PERM 402, wherein PERM 402 is distinct from PCRF 110 and is connected to PCRF 110 via a PER interface. For example, a PER interface may be adapted to facilitate the communication of policy definition information between PCRF 110 and PERM 402.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating a policy event record (PER), the method comprising:
   receiving a policy event trigger including one or more policy event attributes (PEAs) and using the one or more PEAs to select one or more policy definitions that are associated with a communications session, wherein a policy context object is generated by a policy and charging rules function (PCRF) module in response to the policy event trigger, wherein the policy context object comprises a data structure that includes policy identifiers that indicate the one or more policy definitions selected for the communications session and PEA identifiers that identify the one or more PEAs;
   analyzing the one or more policy definitions and initiating one or more associated policy actions, wherein analyzing the one or more policy definitions and initiating the one or more associated policy actions includes generating, at the PCRF module and using the one or more policy actions, one or more policy and charging control (PCC) rules for installation at a policy and charging enforcement function (PCEF) node;
   sending, from the PCRF module to the PCEF node, the one or more PCC rules for installation at the PCEF node via a Gx interface;
   sending, from the PCRF module to the PCEF node, information from the policy context object via a PER interface separate from the Gx interface, wherein the policy context information includes the policy identifiers for indicating the policy definitions at the PCRF module;
   generating, at the PCEF node and using the information from the policy context object, a PER that includes the policy identifiers and the PEA identifiers, wherein the PEA identifiers include an application identifier (ID) indicating an application associated with the communications session and an event type identifier indicating an event type associated with the communications session, where the PER lacks the PCC rules associated with the communications session; and
   sending the PER to a destination distinct from the PCEF node and the PCRF module.

2. The method of claim 1 wherein a policy event attribute includes a radio access technology (RAT) type, an Internet protocol (IP) connectivity access network (IP-CAN) type, a serving mobile country code (MCC), a serving mobile network code (MNC), a session ID, an application ID, a peer identity, a user ID, a user IPv4 address, a user IPv6 address, a called station ID, a mobility protocol, a tier, or an event triggers mask.

3. The method of claim 1 wherein initiating one or more associated policy actions includes generating a PCC rule, updating a user quota, accepting a session, rejecting a session, or signaling a deep packet inspection (DPI) module.

4. The method of claim 1 wherein the PER includes information that identifies the one or more associated policy actions.

5. The method of claim 1 wherein the receiving, the analyzing, and the initiating occur at or are performed by the PCRF module and the generating occurs at or is performed by a PER module (PERM) at the PCEF node, wherein the PERM is connected to the PCRF module via the PER interface.

6. The method of claim 5 where the PERM is associated with a network monitoring system (NMS).

7. The method of claim 5 where the PER interface is adapted to facilitate communication of policy definition information between the PCRF module and the PERM.

8. A system for generating a policy event record (PER), the system comprising:
   a policy definition selection module (PDSM) configured to receive a policy event trigger including one or more policy event attributes (PEAs) and using the one or more PEAs to select one or more policy definitions that are associated with a communications session;
   a policy action module (PAM) configured to analyze the one or more policy definitions and to initiate one or more associated policy actions, wherein analyzing the one or more policy definitions and initiating the one or more associated policy actions includes generating, using the one or more policy actions, one or more policy and charging control (PCC) rules for installation at a policy and charging enforcement function (PCEF) node;
   a policy and charging rules function (PCRF) module configured to generate a policy context object in response to the policy event trigger, wherein the policy context object comprises a data structure that includes policy identifiers that indicate the one or more policy definitions selected for the communications session and PEA identifiers that identify the one or more PEAs, to send, to the PCEF node, the one or more PCC rules for installation at the PCEF node via a Gx interface, and to send, to the PCEF node, information from the policy context object via a PER interface separate from the Gx interface, wherein the policy context information includes the policy identifiers for indicating the policy definitions at the PCRF module; and a PER module (PERM) at the PCEF node configured to generate a PER that includes the policy identifiers, wherein the PEA identifiers include an application identifier (ID) indicating an application associated with the communications session and an event type identifier indicating an event type associated with the communications session, where the PER lacks the PCC rules associated with the communications session and to send the PER to a destination distinct from the PCEF node and the PCRF module.

9. The system of claim 8 wherein a policy event attribute includes a radio access technology (RAT) type, an Internet protocol (IP) connectivity access network (IP-CAN) type, a serving mobile country code (MCC), a serving mobile network code (MNC), a session ID, an application ID, a peer identity, a user ID, a user IPv4 address, a user IPv6 address, a called station ID, a mobility protocol, a tier, or an event triggers mask.

10. The system of claim 8 wherein the PAM is configured to generate a PCC rule, update a user quota, accept a session, reject a session, or signal a deep packet inspection (DPI) module.

11. The system of claim 8 wherein the PER includes information that identifies the one or more associated policy actions.

12. The system of claim 8 wherein the PDSM and the PAM are located at the PCRF module.

13. The system of claim 8 wherein the PDSM and the PAM are located at the PCRF module and the PERM is connected to the PCRF module via a PER interface.

14. The system of claim 13 where the PERM is associated with a network monitoring system (NMS).

15. The system of claim 13 where the PER interface is adapted to facilitate communication of policy definition information between the PCRF module and the PERM.

16. A non-transitory computer readable medium comprising computer executable instructions that when executed by a processor of a computer control the computer to perform steps comprising:

receiving a policy event trigger including one or more policy event attributes (PEAs) and using the one or more PEAs to select one or more policy definitions that are associated with a communications session, wherein a policy context object is generated by a policy and charging rules function (PCRF) module in response to the policy event trigger, wherein the policy context object comprises a data structure that includes policy identifiers that indicate the one or more policy definitions selected for the communications session and PEA identifiers that identify the one or more PEAs;

analyzing the one or more policy definitions and initiating one or more associated policy actions, wherein analyzing the one or more policy definitions and initiating the one or more associated policy actions includes generating, at the PCRF module and using the one or more policy actions, one or more policy and charging control (PCC) rules for installation at a policy and charging enforcement function (PCEF) node;

sending, from the PCRF module to the PCEF node, the one or more PCC rules for installation at the PCEF node via a Gx interface;

sending, from the PCRF module to the PCEF node, information from the policy context object via a PER interface separate from the Gx interface, wherein the policy context information includes the policy identifiers for indicating the policy definitions at the PCRF module;

generating, at the PCEF node and using the information from the policy context object, a PER that includes the policy identifiers and the PEA identifiers, wherein the PEA identifiers include an application identifier (ID) indicating an application associated with the communications session and an event type identifier indicating an event type associated with the communications session, where the PER lacks the PCC rules associated with the communications session; and sending the PER to a destination distinct from the PCEF node and the PCRF module.

* * * * *